(No Model.)
J. W. HORN.
Stalk Cutter.
No. 240,517.
Patented April 26, 1881.
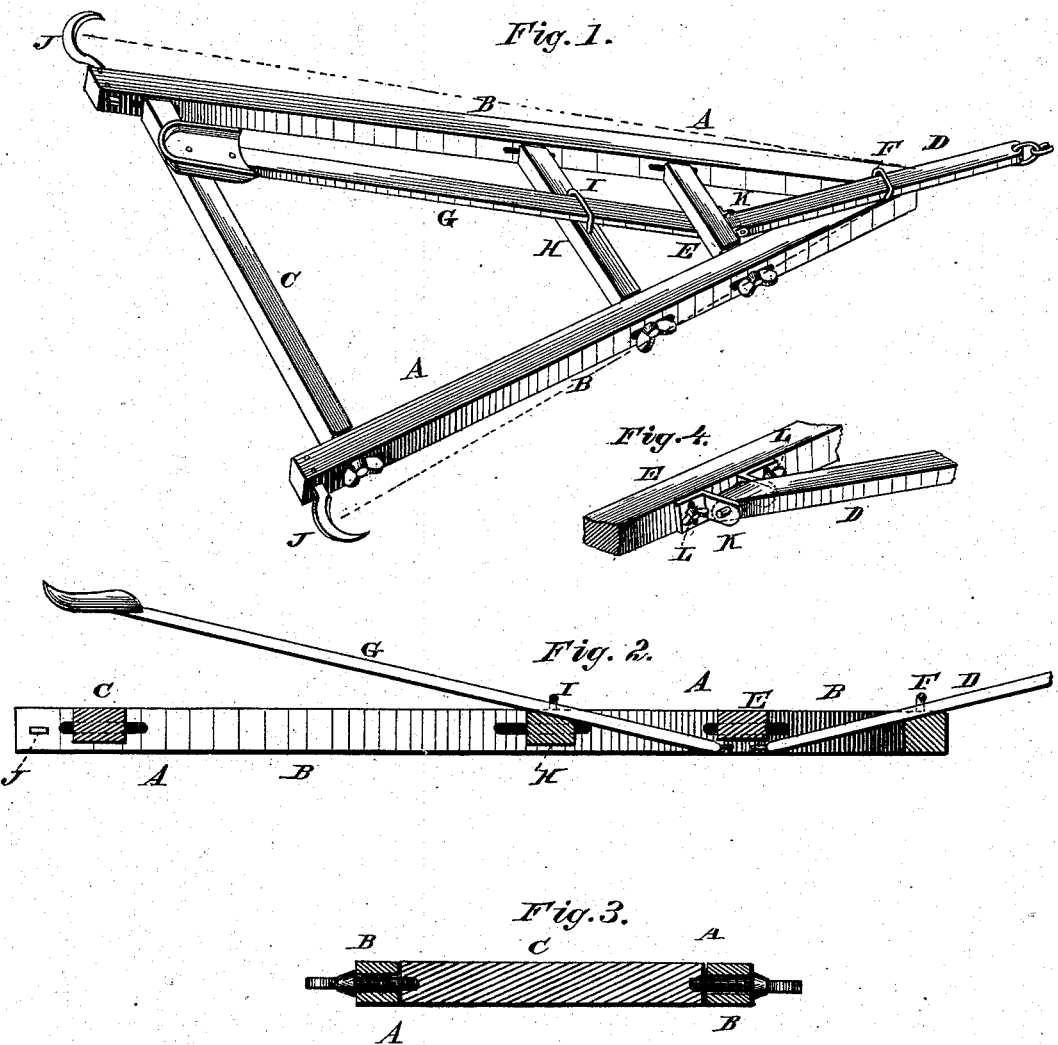
Witnesses:
Fred. G. Dieterich
P. C. Dieterich
Inventor:
John W. Horn
by C. A. Snow & Co.
ATTORNEYS.

United States Patent Office.

JOHN W. HORN, OF RHEA'S MILLS, TEXAS.

STALK-CUTTER.

SPECIFICATION forming part of Letters Patent No. 240,517, dated April 26, 1881.

Application filed February 3, 1881. (No model.)

*To all whom it may concern:*

Be it known that I, JOHN W. HORN, of Rhea's Mills, in the county of Collin and State of Texas, have invented certain new and useful Improvements in Stalk-Cutters; and I do hereby declare that the following is a full, clear, and exact description of the invention, which will enable others skilled in the art to which it appertains to make and use the same, reference being had to the accompanying drawings, which form a part of this specification.

Figure 1 is a perspective view. Fig. 2 is a longitudinal sectional view; and Fig. 3 is a vertical transverse section.
Corresponding parts in the several figures are denoted by like letters of reference.

This invention relates to machines for cutting corn and cotton stalks; and it consists in certain improvements in the construction of the same, which will be hereinafter fully described, and particularly pointed out in the claim.

My improved stalk-cutter consists of a triangular frame, A, the sides of which, B B, are hinged together at the front, their rear ends being connected by an adjustable brace, C, by moving which in a forward or rearward direction the sides of the frame may be spread or drawn together, so as to adapt the machine for rows of any width.

D is the tongue or pole, which is hinged to the under side of a short cross-brace, E, adjustable near the front end of the frame, upon which the tongue is supported in a slanting position, as shown, so that the draft may be conveniently attached. A ring or bail, F, may be used to secure the tongue and prevent its displacement.

G is the seat-bar, which is hinged to the under rear side of the cross-brace E, and supported upon the upper side of an adjustable brace, H, where a staple, I, is provided to confine it.

It will be seen that by moving the braces C E H toward the front of the frame the sides of the latter may be spread, as shown in dotted lines in Fig. 1, thus adapting the machine to cut rows of stalks planted a considerable distance apart.

J J are laterally and outwardly projecting curved knives or cutters, secured to the rear ends of the frame-beams B, so as to cut the two rows of stalks between which the machine is dragged.

Instead of occupying the seat the attendant may walk and employ the seat-bar as a handle wherewith to guide the machine.

To prevent the front end of the tongue from being thrown up too high when the brace E is moved forward, I prefer to hinge it to a bracket, K, vertically adjustable upon the front side of said brace by set-screws L.

From the foregoing description, and by reference to the drawings hereto annexed, the operation and advantages of my invention will be readily understood. It is simple, durable, and effective in operation.

I am aware of stalk-cutters having a laterally-adjustable triangular frame hinged at its forward end, and such I do not claim as my invention; but What I do claim as new and useful, and of my invention, and desire to secure by Letters Patent of the United States, is—

As an improvement in stalk-cutters, the combination of the Λ-shaped frame A, consisting of side pieces, B B, hinged together at their forward ends, and provided with lateral projecting knives or cutters J, and horizontal slots, in which work set-screws for adjusting the cross-braces C H E, tongue or pole D, hinged at its rear end to a bracket, K, vertically adjustable on the front side of cross-brace E, and the seat-bar G hinged or otherwise secured to the under side of cross-brace E, and supported upon the cross-brace H, all arranged and operating substantially as and for the purpose herein shown and specified.

In testimony that I claim the foregoing as my own I have hereto affixed my signature in presence of two witnesses.

JOHN W. HORN.

Witnesses:
JOHN CHURCH,
T. C. GOODNER.